US007806316B1

(12) United States Patent
Torres et al.

(10) Patent No.: US 7,806,316 B1
(45) Date of Patent: Oct. 5, 2010

(54) TRANSACTION SYSTEM FOR VIDEO MATCHING

(75) Inventors: Alexis V. Torres, Trujillo Alto, PR (US); Héctor Vargas, Juana Diaz, PR (US); Luis G. Ramirez-Diaz, San Juan, PR (US)

(73) Assignee: Innovation Institute, Caguas, PR (US)

( * ) Notice: Subject to any disclaimer, the term of this patent is extended or adjusted under 35 U.S.C. 154(b) by 995 days.

(21) Appl. No.: 11/121,951

(22) Filed: May 4, 2005

Related U.S. Application Data

(60) Provisional application No. 60/567,951, filed on May 4, 2004.

(51) Int. Cl.
*G06Q 40/00* (2006.01)
*G07D 11/00* (2006.01)
*G07F 19/00* (2006.01)

(52) U.S. Cl. ..................................................... 235/379

(58) Field of Classification Search ................. 235/379, 235/380, 487, 494; 348/150, 153; 705/27
See application file for complete search history.

(56) References Cited

U.S. PATENT DOCUMENTS

| | | | | | |
|---|---|---|---|---|---|
| 3,294,342 | A | * | 12/1966 | McClure et al. | 406/19 |
| 3,738,592 | A | * | 6/1973 | Smith et al. | 406/19 |
| 4,010,824 | A | | 3/1977 | Bavis | |
| 4,991,008 | A | | 2/1991 | Nama | |
| 5,625,410 | A | | 4/1997 | Washino et al. | |
| 5,751,345 | A | | 5/1998 | Dozier et al. | |
| 5,751,346 | A | | 5/1998 | Dozier et al. | |
| 6,075,560 | A | | 6/2000 | Katz | |
| 6,088,600 | A | * | 7/2000 | Rasmussen | 455/574 |
| 6,476,858 | B1 | | 11/2002 | Ramirez Diaz et al. | |
| 6,631,425 | B1 | * | 10/2003 | Helland et al. | 719/332 |
| 2002/0076060 | A1 | * | 6/2002 | Hall et al. | 381/74 |
| 2004/0153377 | A1 | * | 8/2004 | Dallman | 705/27 |

* cited by examiner

*Primary Examiner*—Kumiko C Koyama
(74) *Attorney, Agent, or Firm*—Hoglund & Pamias, PSC; Roberto J. Rios

(57) ABSTRACT

An integrated surveillance and transaction record system is used to monitor a bank and to save records of transactions. The integrated system includes a central database and server. When a teller executes a transaction, an interface detects relevant transaction data and communicates this with the central database and server. An image of the customer is also captured. The transaction data and customer image are saved as a record in a database. In a drive-in system, a teller identification module obtains a teller identifier and corresponding lane number. This permits the central database and server to match a transaction record with an image of a customer at one of multiple drive-in lanes.

23 Claims, 9 Drawing Sheets

TRANSACTION SYSTEM FOR VIDEO MATCHING

PRIORITY

Applicants claim the benefit of priority to U.S. Provisional Patent Application No. 60/567,951, which was filed on May 4, 2004.

FIELD

The invention relates generally to a system for storing image data of customers making banking transactions, and more specifically a system for creating a relational database of image data which can be searched based upon customer and transaction information.

BACKGROUND

Consumer banks can make thousands of transactions on any given day. These include deposits and withdrawals at automated teller machines (ATMs), walk-in tellers and drive-through tellers. As ATMs have become more pervasive, bank customers are able to make more transactions in smaller amounts. For example, today an ATM can be found near virtually every restaurant or movie theater. A bank customer, therefore, need not withdraw all of the money he or she will need to spend over the course of a week but can instead withdraw money in a smaller amount as it is needed.

Typically, a customer will save a record of each banking transaction he or she makes. Such records generally can be printed at an ATM or recorded in a personal ledger. As a customer makes more transactions, however, the chance that the customer will fail to save a printed receipt or record a transaction in a personal ledger increases. When a customer receives an account statement at the end of a month, he or she may find that one or more transactions are unrecorded by either a receipt or notation in a personal ledger. If the customer does not independently remember making the transaction, he or she may dispute the charge with the bank.

One of the best methods for a bank to respond to such an inquiry from a customer is to present an image of the customer making the transaction. For this reason, virtually all ATMs, in-person tellers and drive-through tellers are recorded by video. When a customer disputes a charge, the bank retrieves the relevant video and presents it to the customer.

An example of a prior-art system for saving video images of customers making banking transactions is shown in FIG. 1. The system consists of a banking network 100, which includes a number teller terminals 102 and 104 as well as ATMs 106. The teller terminals 102 and 104 each have an attached printer 108 and 110 for generating transaction receipts. The teller terminals 102 and 104 may be associated with walk-in or drive-through customer stations. The terminals 102 and 104 connect through a LAN switch 112 to a central banking application system 114. The ATM 106 typically includes an integrated video camera 116 and connects through a secure network 113. In addition to transaction data, the ATM 106 provides a digital image of the customer from the video camera at the time of the transaction by means of a transaction interface module 115. This is stored for later retrieval in the event that a customer challenges a transaction or in the case of an unauthorized use of a customer's ATM card. The banking network 100 also includes a surveillance system 118. This includes video cameras 120 and 122, which are oriented to capture each of the terminals 102 and 104. It also includes a central data storage and monitoring station 124. If a customer challenges a transaction made at a terminal, the video from the time of the transaction can be recalled from this data. Typically a bank retains this video for a time period sufficient to respond to any customer complaints that a particular transaction was not authorized by them.

Although this method of resolving customer disputes can be extremely effective, it can also be costly. A large consumer bank may operate literally thousands of tellers. To find a segment of video from thousands of hours of recorded data is extremely time consuming. It can also become costly to retain this data.

A variety of systems provide improved access to video data associated with a particular transaction. For example, U.S. Pat. No. 4,991,008, titled "Automatic Transaction Surveillance System," and issued to Nama, discloses a system for storing transaction information along with the video image. The data is included as part of the video image itself. One disadvantage of this design is that it does not readily permit automated searches based upon transaction data.

Another example is U.S. Pat. No. 6,075,560, titled "Asynchronous Video Event and Transaction Data Multiplexing Technique for Surveillance Systems," and issued to Katz, which discloses a system that records transaction data for later review. It separately stores transaction data and video data. The transaction data and video data each include a synchronization signal. After the video is recorded, it is later matched with the transaction data by use of the synchronization signal. One disadvantage of this design is that the video data is not matched or synchronized with the transaction data until some time after it is recorded. In some applications, security personnel may need immediate access to a transaction and associated video data.

Additional complexity arises in the context of drive-in teller stations. One example of a drive-in system is shown in FIG. 2. The system consist of two teller stations 202 and 204 as well as four customer stations 206, 208, 210 and 212. A teller is able to send and receive monies and transaction documents to each of the customer stations 206, 208, 210 and 212 through a tube conveyor system 214. The teller also is able to communicate with each of the customer stations 206, 208, 210 and 212 through an intercom system. Cameras 216, 218, 220 and 222 are each positioned at one of the customer stations 206, 208, 210 and 212. Image data from these cameras can be viewed by the teller and is also stored for later retrieval. A camera 218 is also positioned at the teller stations 202 and 204. Image data from this camera can be stored for later retrieval. Further details of a conveyor system used in connection with a drive in system are disclosed in U.S. Pat. No. 4,010,824, titled "Conveyor System for Drive-In Banks and the Like," and issued to Bavis, which is incorporated by reference in its entirety.

In the event that a customer challenges a transaction made at a drive-in teller, the image data can be retrieved based upon the time of the transaction. Retrieving this data, however, can be more time consuming because the lane or customer station is not necessarily recorded with the transaction information. Thus, the recorded video for each customer station may need to be reviewed in order to find the needed video segment.

In addition to, or as part of, a transaction recording system, most financial institutions also use a video surveillance system. An example of a security system is disclosed in U.S. Pat. No. 6,476,858, titled "Video Monitoring and Security System" and issued to Ramirez Diaz, et aL. This patent discloses a system that receives video images from a number of cameras. Up detection of motion or other security event, the video image is captured. This patent is incorporated by reference in its entirety.

Another example of a security system is disclosed in U.S. Pat. No. 5,625,410, titled "Video Monitoring and Conferencing System," and issued to Washino, et al., which is incorporated by reference in its entirety. This patent discloses a PC-based system for monitoring and storing representative images from video cameras, which may be used for security or other monitoring applications. Camera inputs from digital or analog sources are individually and independently digitized and displayed at a first set of image sizes, sampling rates, and frame rates, and may be stored in digital form on various recording media at a second set of image sizes, sampling rates, and frame rates, and these two sets of sizes and rates may or may not be identical. Provisions are included for adding detection or alarm systems which will automatically alter image size, sampling rate and/or frame rate of an individual input source, or activate other physical responses.

SUMMARY

A video surveillance system, such as the one disclosed in U.S. Pat. No. 6,476,858, monitors a financial institution. In addition, the video surveillance system stores images based upon a triggering event, such as a financial transaction at a teller. The integration of a video surveillance system and a transaction storage system eliminates overlap between these two systems and provides a common platform. The integrated system includes transaction detection devices at each terminal. For each transaction, a teller will print or store a record of the transaction through a USB, TCP/IP, serial, parallel or other interface with a printer. A transaction detection device is connected to the appropriate interface and sniffs for a transaction identifier. When one is detected, it triggers the integrated system to capture a video image. The transaction data and video image are stored as part of a record in a database. Unlike systems which record transaction data on a video image, this method creates a relational database which can be searched using any one of a number of fields. These fields include customer account number, card number, date and time, amount, transaction identifier or teller identifier. The integrated system captures video data from all types of tellers, including drive-in tellers, in-person tellers and ATMs. Thus, a search of the database based upon an account number will identify all records associated with that account number. And the associated video for each transaction is immediately available.

By saving video images only upon detection of a transaction, substantially less video will need to be recorded in order to create a complete record. The specific amount of video that is saved, including the resolution, image size, frequency (or period between images) and the time length (or number of images) can be set through the integrated system, which is also referred to as the platform. Depending upon the data storage available on the integrated system and the specific user settings, it is possible to store millions of transactions with their corresponding video images. This can permit storage of several years of video data which is immediately accessible based upon any of the record fields. When the database is eventually filled, the oldest records can be identified and deleted. Furthermore, the same camera is used to obtain the video surveillance images. These video surveillance images are stored independently. Because video surveillance images are typically needed for a shorter period of time, they can be deleted without affecting the integrity of the transaction images.

A further aspect of the invention involves saving images from drive-in teller stations. A single teller may interact with multiple customer stations. The system matches the video image from the appropriate camera with the transaction record for storage in the database. When a triggering event occurs at the teller station, a determination is made as to which customer station the teller is working with. This determination can be made through existing bank systems or by the addition of a keypad which the teller operates to provide this information or by an automated capsule sensor. Based upon this determination, video image data is recorded along with the transaction data. Video image data of the teller can also be recorded as part of the database record. Because the drive-in video data becomes part of the same database as other transaction data, a search based upon account number will retrieve drive-in, in-person and ATM video images associated with the account.

In one embodiment a database is provided which is suitable for storage of image data taken during bank transactions. The database system receives video signals each of which is associated with a respective drive-in banking station. The database system receives a plurality of teller transaction records. Each transaction record includes an account number, a time and date, an amount, a transaction identifier and a teller identifier. The database system receiving matching signals which matching the teller transaction records to one of the drive-in banking stations. The database system stores records in a database. Each of the records includes one teller transaction record and customer image data showing a customer associated with the transaction record proximate a time when the transaction record is made. The customer image data is received from the video signals each associated with the respective drive-in banking station.

In another embodiment, a database system saves image and transaction data obtained from a bank. The database system includes teller stations configured to receive information from a teller and execute a banking transaction. It also includes transaction interfaces configured to monitor communications with the teller stations. It includes customer stations in drive in-lanes. Video cameras are positioned to capture images of customers at the customer stations. An input receives information that matches transaction information with images of the customer. The database system captures images of the customers in the drive-in lanes through the video cameras. The database system captures transaction records through the transaction interfaces. The database system receives signals from the input that matches the images of the customers with transaction records. The database system saves the matched transaction records and the images of the customer in a database.

DETAILED DESCRIPTION

Figure 1:
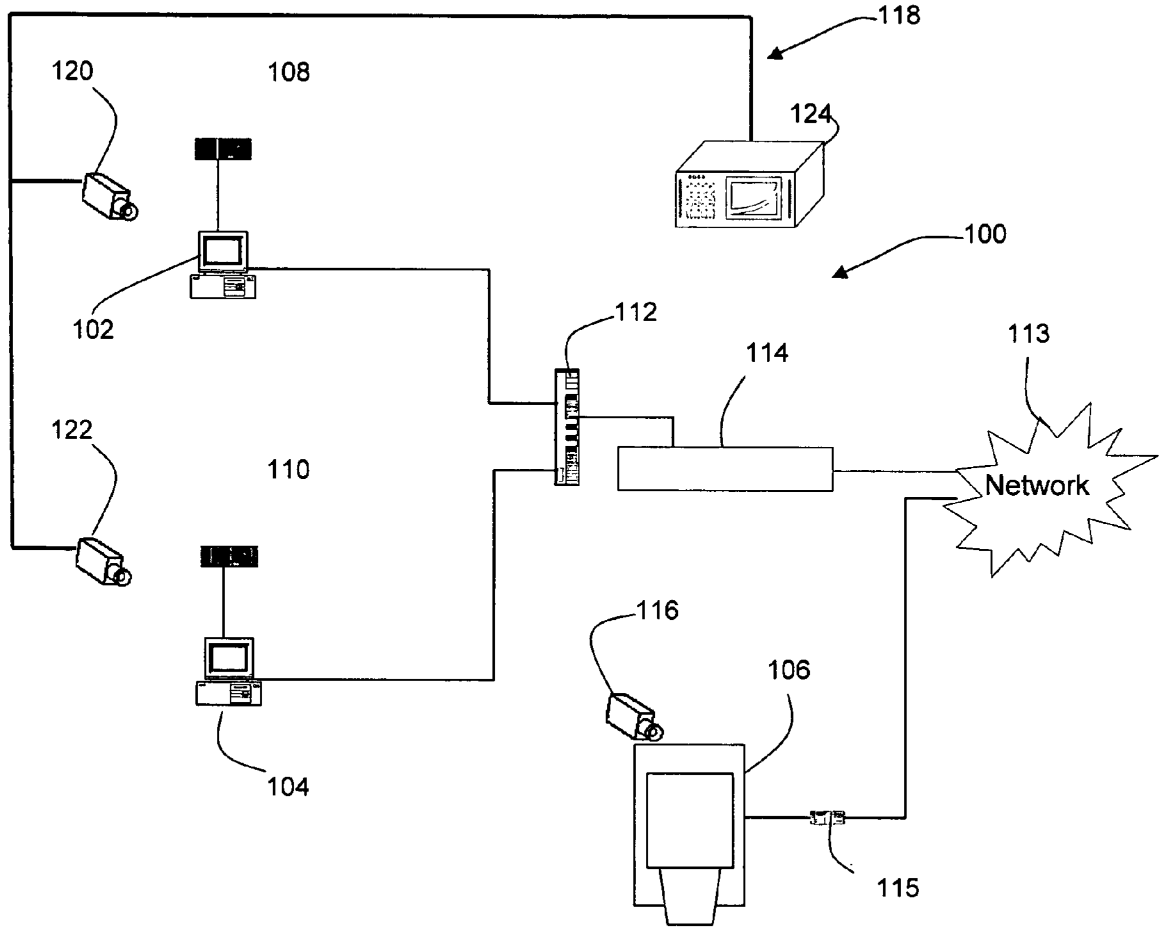
Figure 1 (Prior Art)
FIG. 1 is a block diagram of a prior art bank transaction system and separate surveillance system.
Figure 2:
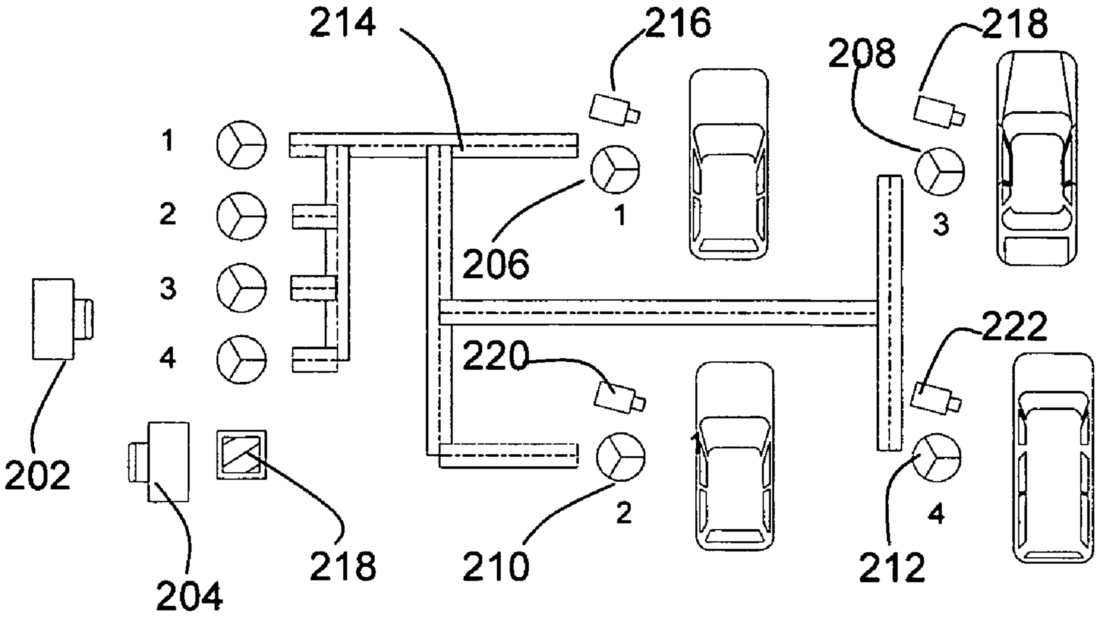
Figure 2 (Prior Art)
FIG. 2 is a block diagram of a prior art bank transaction system that includes drive-in customer stations.

A video surveillance and transaction system are integrated into a common platform. The system includes a central database which receives video data from various cameras located throughout a bank and positioned to capture images of customers and tellers. The images are stored along with transaction data in a relational database. The images are captured from in-person and drive-in tellers. They are also captured from ATMs.

A typical transaction-based banking system includes transaction terminals, terminal printers, a surveillance video system and associated cameras and ATMs. The transaction information received from the ATM includes digital video images. When the transaction information is received, the information is linked together with the video being stored. Added to this typical system are transaction interfaces. An interface between the transaction banking system and the video surveillance system is provided. This integrated system is capable of intercepting the transaction information from any banking transaction terminal and storing it with the corresponding video image. This transaction can be performed on data from ATMs, in-person tellers or in the drive-thru tellers. Additional functionality includes storing the transaction and the video together.

When a transaction is received in the surveillance system, then the system starts to record images. The amount of images and the time between them are a programmable parameter in the system. By using this method, the system has the capacity to store more images and transaction information than if the video image data is simply saved separate from transaction data. Additional functionality of the system is the drive-thru interface. This allows for the matching of transaction information and video images from a customer station that initiated the transaction.

Another characteristic of the system involves the flexible method of capturing transaction information. The system can capture transaction information by reading the information sent from the teller station to the printer, by reading from communication between a teller station and the banking application system, or by reading the information sent by the banking application system to a teller station. The system uses hardware interface modules to capture the transaction information from these different locations.

For capturing transaction data from a teller station when it is sent to a printer, the hardware interface will depend upon the connection between these two devices. It can be a serial, parallel, USB, or IP connection. For capturing transaction data from a teller station to the banking system or vice versa, an IP connection can be used. When data is captured upon transmission by the banking system, a single transaction interface can be used because it will have access to all transaction data.

Alternatively, a direct connection can be made with the banking system. A direct connection can be made through an RS232 port.

For capturing transaction data from an ATM, an RS-232 connection can be used. In this configuration an RS232 interface is used to receive the transaction information from the ATM. Then the transaction is sent to the database system. Alternatively, a direct data interface can be used. For example, a serial interface is used to capture the data sent from the ATM to the host. The data captured is then sent to the database system. Alternatively, an IP connection can be used. An IP interface is used to capture the data sent from the ATM to the host banking system and then it is sent to the database system.

For capturing data from a drive-through banking system, an additional module can be provided. The module identifies which teller processed a transaction and which lane the transaction originated from. The video image is captured using the camera pointing to the specific lane. The system allows for the identification of which lane the transaction belongs and which teller station processed the transaction.

Drive-in Teller Station

Figure 3:
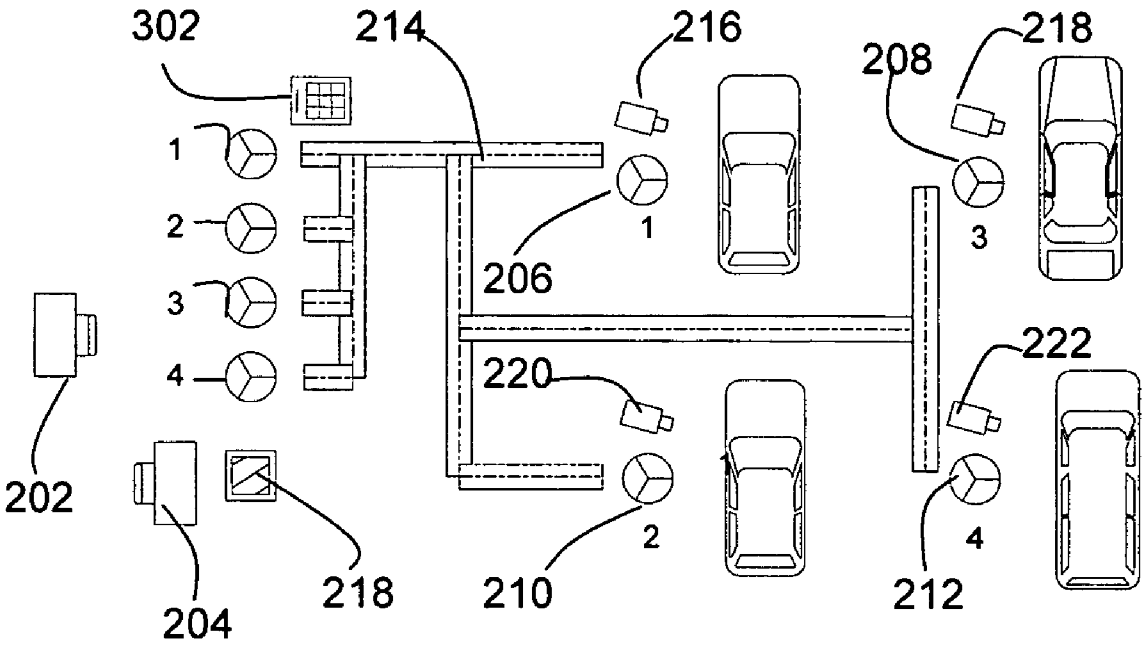
FIG. 3 is a block diagram of a bank system that includes drive-in customer stations and an interface 302 for matching transaction records with images of the associated customer.

Turning to FIG. 3, a drive-in teller system has been modified so that a video image of a customer can be matched with a transaction. The system adds a keypad 302. The keypad is interlocked with access doors to the conveyor tubes 1-4 for each of the customer stations 206, 208, 210 and 212.

Figure 4:
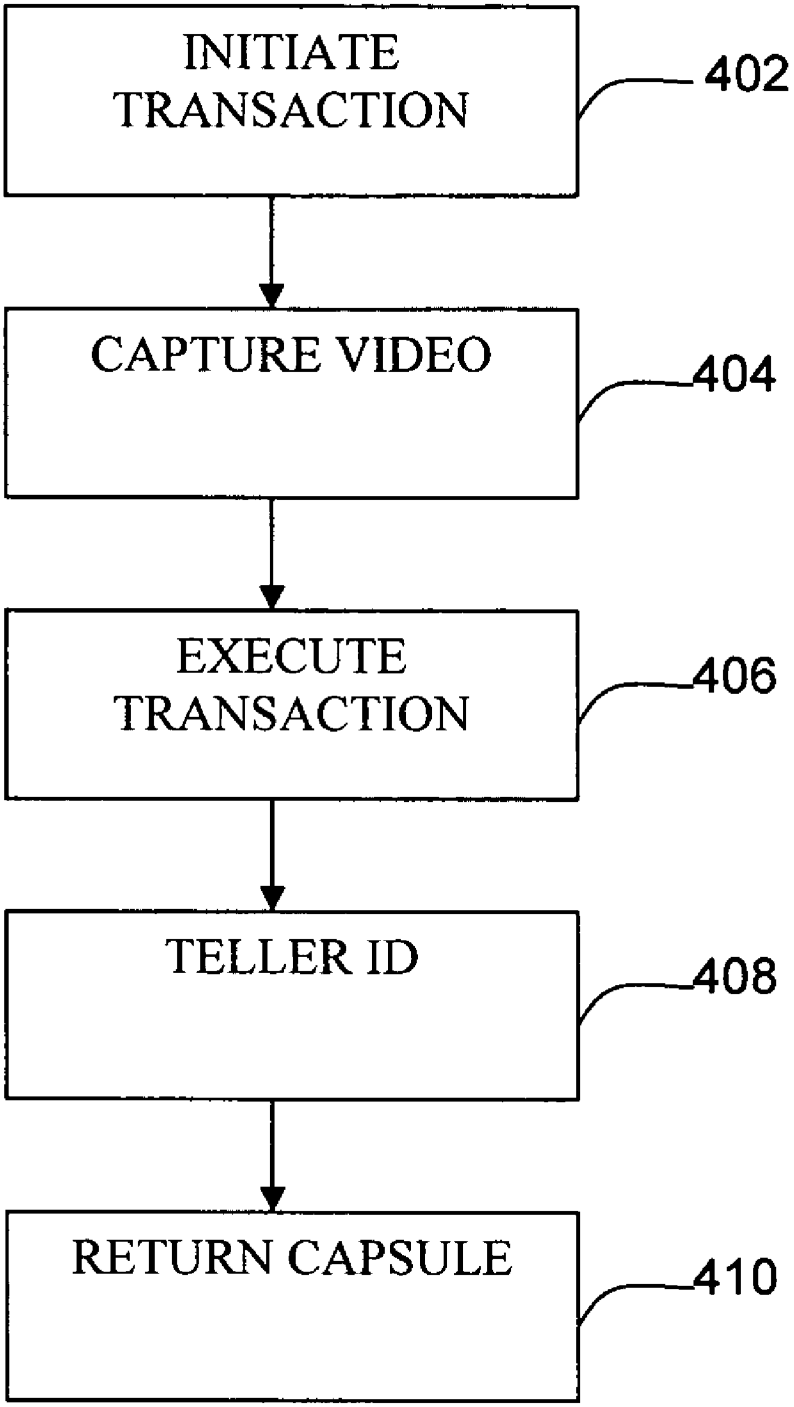
FIG. 4 is a flow chart showing one method of saving transaction records with images of customers at drive-in banking stations.

The method of operating this modified drive-in teller system is described with reference to FIG. 4. At step 402, a customer 224 (shown in FIG. 3) initiates a transaction by placing monies, documents and/or identification in a capsule. The customer 224 actives a send command which conveys the capsule to a bank teller. At step 404, proximate the time that the customer 224 activates the send command, a video image of the customer is captured from the video camera 216. At step 406, a bank teller receives the capsule and removes its contents at his or her assigned teller station 204. The teller has either entered his or her teller identifier in the teller station or enters it at the time of executing the transaction. Upon completion of the transaction, the bank teller prints a receipt or creates some record of the transaction. The receipt, identification or any other documents belonging to the customer are placed in the capsule by the teller. At step 408, in order for the teller to return the capsule to the customer, an interlock with the keypad 302 requires that the teller again enter his or her teller identifier. At step 410, the teller transmits the capsule back to the customer.

As will be further described below, the surveillance system receives the captured video when the customer initiates the transaction. The system also receives a record of the transaction when it is executed by the teller. Finally, the system receives the teller identifier and lane number when the capsule is returned by the customer. With this data, the system can create a record that includes a video image of the customer to whom the capsule is being returned and a record of the transaction. The teller number entered when the capsule is returned to the customer matches the transaction record with the captured video.

Figure 5:
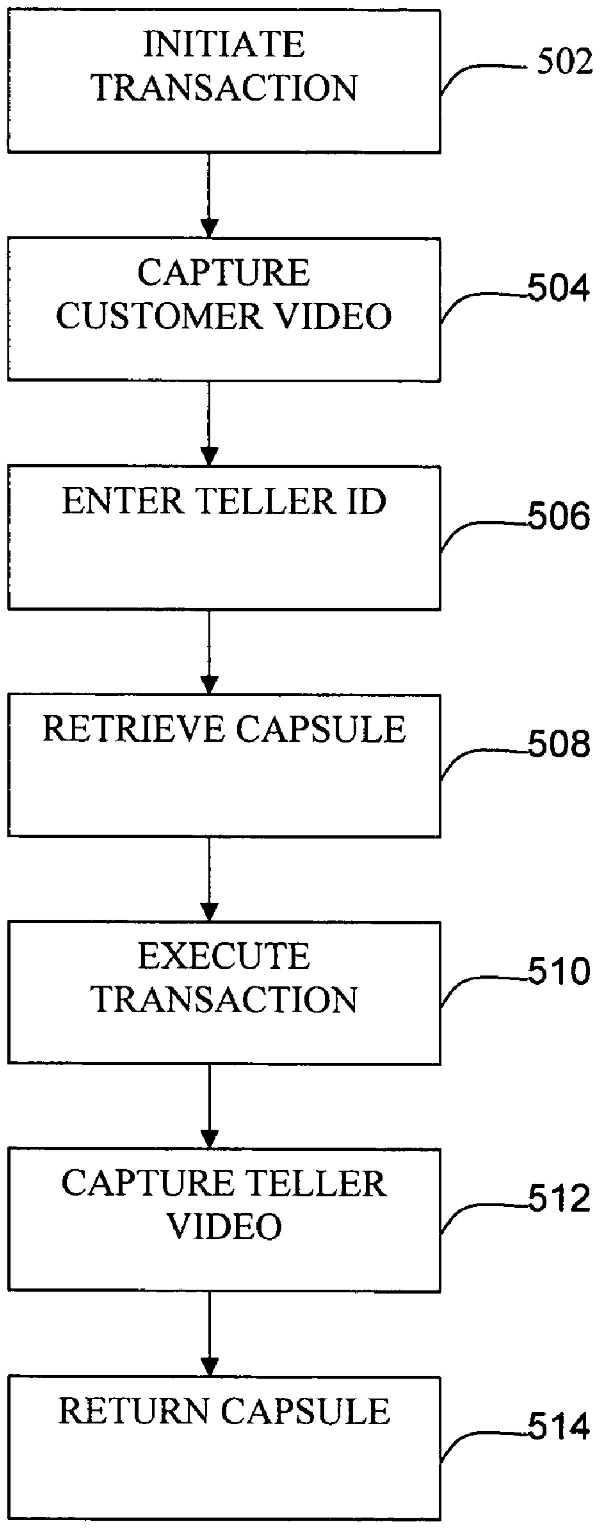
FIG. 5 is a flow chart showing one method of saving transaction records with images of customers at drive-in banking stations.

Turning to FIG. 5, another method of operating the drive-in teller system is described. At step 502, a customer 226 (shown in FIG. 3) initiates a transaction by placing monies, documents and/or identification in a capsule. The customer activates a send command (or the teller can activate a bring command). This conveys the capsule from the customer station 208 to the bank. The transmission of the capsule serves as a trigger. At step 504, the transmission is reported and a segment of video from camera 218 is recorded. The video segment is associated in the database with the customer station and lane from which the capsule was transmitted. At step 506, the teller that will handle the transaction must then enter his or her identifier on the keypad as well as the lane that the teller will be serving. If the teller identifier is valid and if the lane has a pending capsule, then an interlock for lane 3 is released to permit the teller to retrieve the capsule at step 508. At the same time, the teller is associated in the database with the record containing the video segment for the customer. At step 510, the teller proceeds to execute the transaction. Upon completion of the transaction, a record is created. This is detected through a transaction interface. At step 512, a video segment of the teller is captured. A transaction record and the video segment of the teller are added to the record containing the video segment of the customer. At step 514, the teller returns the capsule to the customer. This is detected. The record is complete and the session is terminated so that the teller can move on to a new customer.

Another embodiment of the invention follows the same steps, but uses another method for identifying which teller is servicing which customer. Rather than require the teller to enter an identifier and lane before servicing a request, each lane has a dedicated capsule. These capsules include an electronic tag. Each teller station has detection circuitry so that when a teller initiates a transaction at a terminal, the capsule identifier is captured and the lane with which the teller is working is identified. Thus, when the teller executes a transaction, the transaction data can be added to the record created when the customer sent the capsule.

Data Collection System

Figure 6:
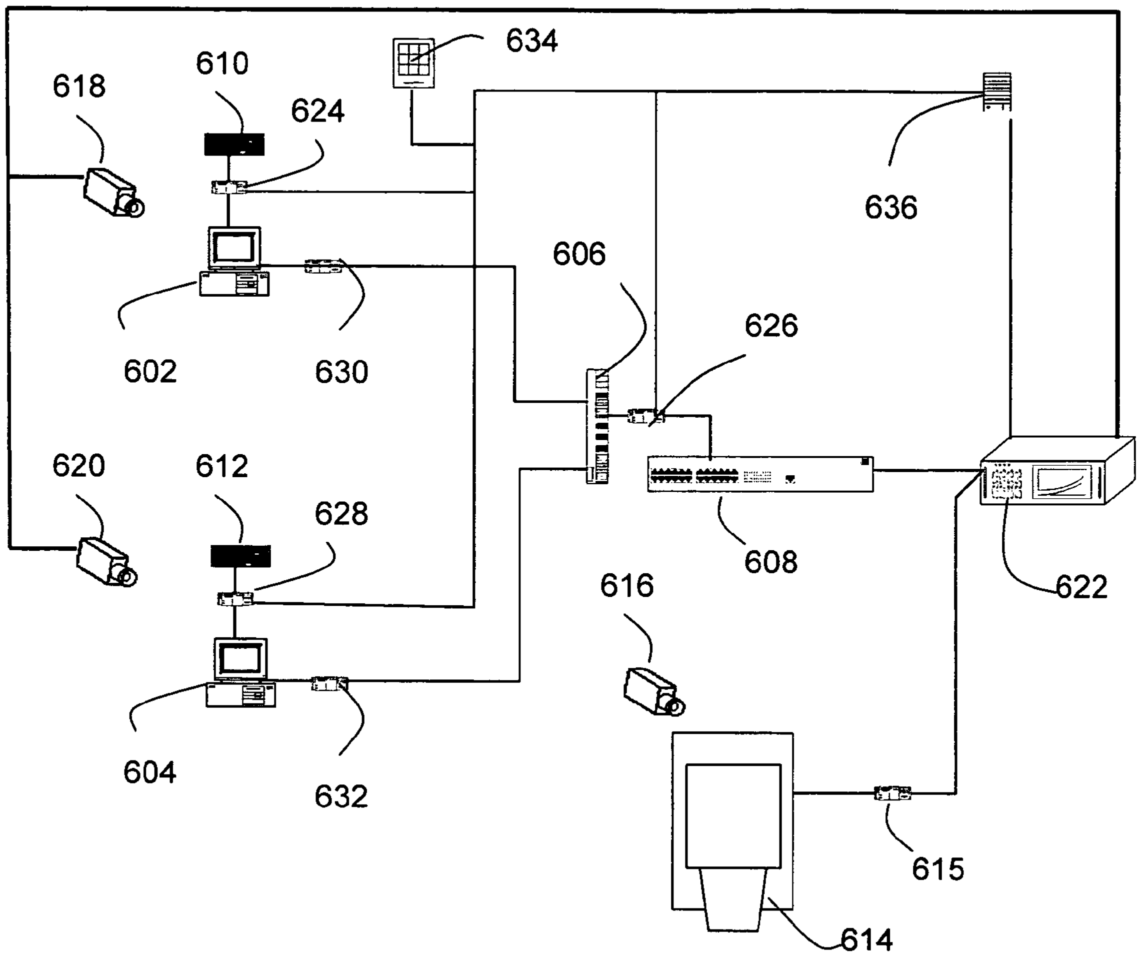
FIG. 6 is a block diagram of an integrated bank transaction system and a surveillance and database system.

Turning to FIG. 6, a surveillance and data collection system is described in connection with a bank transaction system. The bank transaction system includes a number of transaction terminals 602 and 604. Although only two are shown, in most banking applications a larger number would be used. These transaction terminals can be used to service walk-in customers as well as drive-in customers. The transaction terminals connect through a local area network (LAN) switch 606 to a banking application server 608. Tellers use the transaction terminals 602 and 604 to access customer account data from the banking application server 608. Deposits, withdrawals and other transactions are executed at the transaction terminals 602 and 604. These transactions are made through communications between the transaction terminals 602 and 604 and the banking application server 608. Each terminal is connected to a printer 610 and 612. The printers are used to create transaction records that are provided to a customer.

The bank transaction system also includes an ATM 614 and an associated camera 616. The ATM is connected with the banking application server 608 and, like a teller station, communicates with the banking application server 608 to execute a customer transaction. From the camera 616, the ATM provides a digital photograph of the customer at the time a transaction is made. Although only one ATM is shown, in a typical bank many more would be implemented.

The surveillance and data collection system includes a number of video cameras 618 and 620. At least one video camera is provided for each teller station. For walk-in tellers, the cameras are positioned to capture an image of the customer and teller. The cameras are also positioned to capture images used for video surveillance. For drive-in tellers, one camera is positioned to capture an image of the customer and another camera can be positioned to capture an image of the teller. The customer configuration was shown and described above with reference to FIG. 3. In a typical installation, more than two cameras are used. Those shown are for purposes of illustration only. Each of the cameras connects with the surveillance and data collection system or data server 622. This data server 622 is a computer system which includes a bank of memory devices, (e.g., hard drives) suitable for storing large amounts of video image and other data. Video from the cameras is converted into digital format. This can be accomplished by the use of digital cameras; it can also be accomplished by a video to digital converter card at the data server 622. An event trigger, such as a signal indicating that a customer at a drive-in station has sent a canister or a signal indicating that a teller has printed a transaction receipt, can cause the data server 622 to open a new record and save a video image along with transaction data.

The ATM 614 itself creates all of the information needed to create a new transaction record in data server 622. The ATM will transmit a video image along with transaction data by a hardware module 615 through a network to the ATM host system as well as to data server 622. Upon receipt of a new set of transaction data, the data server 622 creates a new record. Contents of one transaction record are described below with reference to FIG. 9.

The triggering event used to initiate the creation of a new record from a teller station is generated by transaction interfaces. These include USB, serial, parallel and TCP/IP transaction interfaces. For example, a parallel transaction interface 624 can be connected between a teller station and a printer. It would capture transaction data sent from the teller station to the printer when a transaction is completed. A TCP/IP transaction interface 626 could be connected at the banking application server 608. It would sniff network traffic to detect data related to a transaction. Upon detecting such data, it would be copied and sent to the data server 622. Since the banking application server 608 receives all transaction data from the tellers, the TCP/IP transaction interface 626 would be able to capture all transactions occurring within the network. Depending upon the particular configuration, a single transaction interface, or some combination of multiple transaction interfaces at various locations throughout the bank transaction system, can be connected in the network so that transactions from each teller can be captured.

In the network shown in FIG. 6, an additional transaction interface 628 is connected between transaction terminal 604 and printer 612. Depending upon the type of printer, this could be a USB, parallel or serial transaction interface. Two additional transaction interfaces 630 and 632 are connected with the network interface of transaction terminals 602 and 604, respectively. These would sniff network traffic from each terminal. When a teller completes a transaction, it would send transaction data to the banking application server 608. This is captured by the transaction interfaces 630 and 632. Because transaction data from the transaction terminals 602 and 604 is captured by transaction interfaces 624 and 628, these additional transaction interfaces 630 and 632 are duplicative. They would not be needed in order to obtain a complete record of transactions from the transaction terminals 602 and 604, however, they could be implemented for redundancy purposes to ensure that every transaction is captured. Likewise, the transaction interface 626 would capture a duplicative set of transaction data, which would not be needed to obtain a complete record of transactions but which could be used for purposes of redundancy.

In addition to the transaction interfaces, a drive-through interface 634 connects with circuitry associated with the drive-in customer stations and associated conveyor system. The drive-through interface 634 connects with the send and bring buttons that are used to operate the conveyor system that transmits capsules back and forth between the tellers and customers. When a capsule is transmitted from a customer station to a teller, the drive-through interface transmits a trigger signal. This prompts the data server to capture a digital image from the associated customer station and open a new record for this data.

The various transaction interfaces 624, 626, 628, 630 and 632 can be connected through an input/output concentrator 636. Although the signals from the transaction interfaces could be routed directly to the data server 622, this reduces the number of input/output connections needed at the data server 622. For a large operation, physical constraints can require a reduction of the number of connections made to the data server. This can also reduce the overhead burden on the data server for monitoring multiple connections.

Transaction Interfaces

The transaction interfaces are responsible for capturing transaction information. This information can be captured by intercepting the information sent from a teller station to a printer or from a teller station to the banking application server. Hardware modules are connected in the banking application server network, which capture the transaction information from the different tellers. These hardware modules provide the functionality needed to for the transaction interface.

Figure 7:
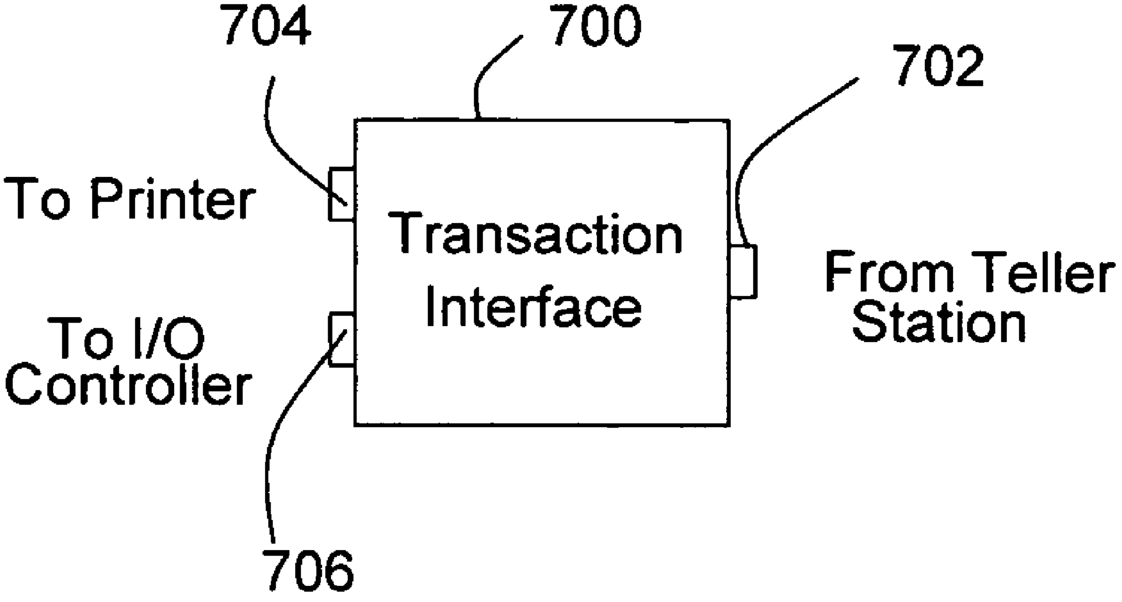
FIG. 7 is a block diagram of a transaction interface.

A hardware module 700 is shown in FIG. 7. It includes a connection 702 to a teller station. It also includes a connection 704 to a printer. The hardware module 700 provides a direct path between these two connections so that any data sent from the teller station will be received by the printer. The hardware module 700 also includes a connection 706 to an input/output controller. The hardware module intercepts communications between the teller station and the printer. When the hardware module detects that a transaction record is being sent, it obtains the transaction data and transmits it through connection 706. The data, however, is also passed through to connection 704 without interruption. Depending upon the type of connection between the teller station and the printer, the connections 702, 704 and 706 can be USB, parallel, serial or other communication protocol.

Alternatively, a TCP/IP interface can be used. The TCP/IP interface has the same hardware configuration as shown in FIG. 7 and identified as hardware module 700. A network connection is passed through connections 702 and 704. The additional connection 706 provides intercepted data to the input/output concentrator. In this configuration, a TCP/IP interface can monitor all communication with the banking application system. The TCP/IP interface identifies which transaction goes from the banking transaction system to a particular teller station by identifying the MAC or IP address. Once the transaction is received and identified, the TCP/IP transaction interface sends the information to the I/O controller to be processed by the transaction/video system. This interface is used for both teller station and ATM machines which use TCP/IP communication.

Alternatively, transaction/video system which is connected to the TCP/IP network provides dual functionality. First, the TCP/IP connection is used to transport all the information used by the transaction/video system including live or recorded video, configuration parameters, etc. Second, an additional software module monitors all communications between the banking transaction system and the teller stations by means of the MAC or IP address. Once a transaction is identified by the transaction/video system, it starts the collection of images from the transaction.

Drive-In Interface

Figure 8:
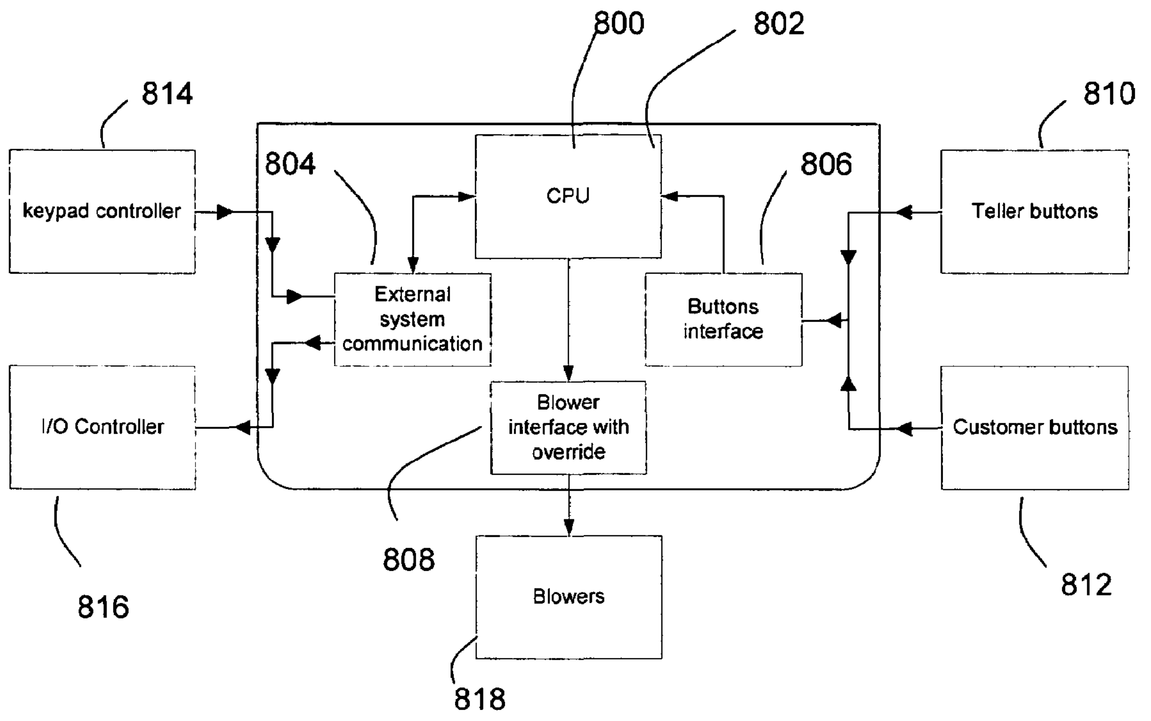
FIG. 8 is a block diagram of an interface used to match a teller with a customer lane.

Turning to FIG. 8, a drive-through interface 800 is described. It includes a processor (or controller) 802 which provides the necessary control functions. The processor interfaces with a communication interface 804, a button interface 806 and a conveyor interface 808. The communication interface 804 connects with a keypad 814, through which a teller can enter his or her identifier along with the customer lane with which the teller is working. The communication interface 804 also connects with an I/O controller 816. This is used to send and receive data. In a functioning system, the I/O controller 816 transmits data through an I/O concentrator (shown as 636 in FIG. 6) to a data server (shown as 622 in FIG. 6). The conveyor interface 808 connects with control circuitry for the conveyor system 818, which includes blowers that are used to move a capsule from a customer station to a teller and vice versa. The button interface 806 connects with teller buttons 810 and customer buttons 812. When a customer hits a send button, this signal is communicated to the processor 802 through the button interface 806. The processor 802, in turn, notifies a data server through I/O controller 816. Likewise, when a teller activates a send or bring button, this signal is communicated to the processor 802 through the button interface 806. The processor 802, in turn, notifies the data server through communication interface 804 and I/O controller 816.

Depending upon the particular configuration, the processor 802 can be programmed to control or override the conveyor system. For example, processor 802 may not permit a teller to open a door to retrieve a capsule from a customer until the teller first enters an identification and customer lane number through keypad 814. Similarly, processor 802 may not permit the teller to return a capsule to a customer until entering an identifier and lane number through the keypad. Thus processor 802 can override the teller's send command by blocking a circuit that would activate a blower that would move the capsule to the customer. When a teller provides information through the keypad 814, this data is transmitted by the processor 802 through communication interface 804.

Database Structure

Figure 9:
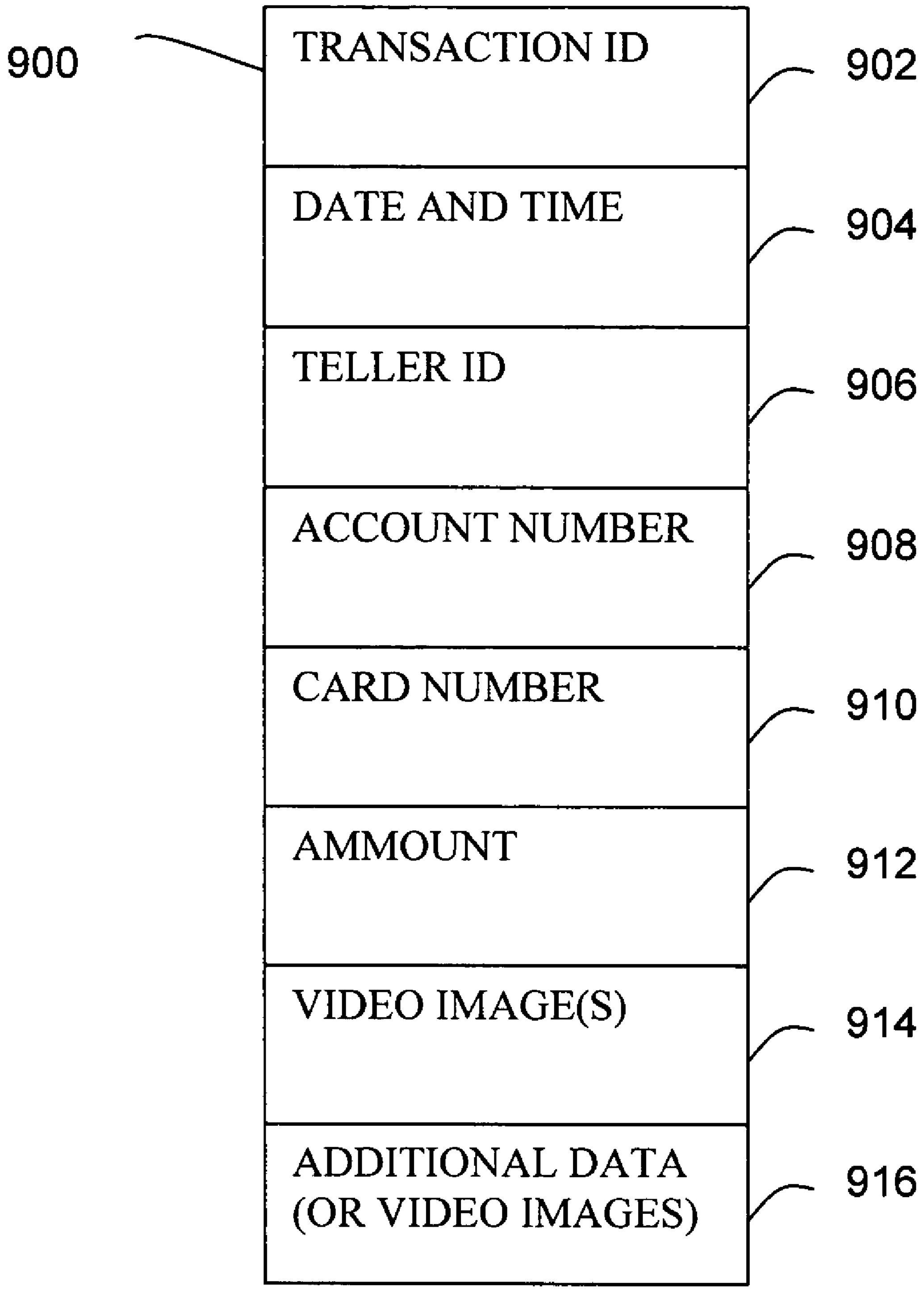
FIG. 9 is a block diagram of a transaction record.

Turning to FIG. 9, a database structure implemented in the database server is described. The database consists of records 900, each of which represents a customer transaction. The individual record is divided into a number of different fields. These include a transaction identification field 902, a date and time field 904, a teller identification field 906, an account number field 908, a card number field 910, an amount filed 912 and a video field 914. Depending upon the implementation, additional video fields 916 may be included. The amount of video saved for a particular transaction will depend upon the need and storage capacity of a particular application.

The transaction identification field 902 records a unique identifier that is assigned by the bank server when a transaction is executed. The date and time field 904 records when the transaction occurred. The teller identification field 906 records an identifier associated with the teller that executed the transaction. In a bank, each teller station can be assigned a teller identification. When working with a drive-in, this is used to match customer data with a particular transaction record. When a transaction is executed by an ATM, the teller identification field will record a unique identifier associated with the ATM. The account number, card number and amount fields 908, 910 and 912 record the relevant transaction data. The information recorded in fields 902, 904, 906, 908, 910 and 912 is captured by the transaction interfaces (described above).

The video field 914 is captured separately. For in-person tellers, the video is matched with transaction data in a record by capturing video data from the camera associated with the teller station that is executing the transaction and saving it along with the transaction data that triggered the data server to record the video. For drive-in tellers the video capture can be triggered by the activation of a send button by the customer. This video is recorded. The transaction data from a particular transaction is matched with the video data by matching the teller with a lane. For example, when the teller completes a transaction and attempts to return the capsule, he or she will need to enter his or her teller identifier along with the customer lane with which he or she is working. Since a video image was captured when the customer sent the capsule to the teller, a record with video data will remain open awaiting transaction data. This record is matched with transaction data when the teller identifies the lane with which he or she is working. Additional video images can be stored depending upon the particular implementation. Likewise, when a teller is working with a drive-in, the system may capture an image of the teller at the time the transaction is executed. This image is saved as part of the record 900 in field 916.

By saving the transaction data along with associated video image data in a record, the relational database can be searched based upon any of the fields. For example, a particular account number can be searched and all records associated with that account would be identified. This permits rapid access to relevant video image data when a customer contests a particular entry on his or her monthly statement. Moreover, by only saving relevant video image data, the amount of storage is greatly reduced.

Construction of Claims

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Those skilled in the art will appreciate that many modifications, variations and changes could be made to the embodiments that have been described without departing from the invention. The following scope of equivalents to the claims is intended to encompass all such modifications, variations and changes.

We claim:

1. A method of operating a database suitable for storage of image data taken during bank transactions comprising the steps of:

receiving a plurality of video signals each associated with a respective drive-in banking station;

receiving a plurality of teller transaction records, wherein each transaction record includes an account number, a time and date, an amount, a transaction identifier and a teller identifier;

receiving matching signals comprising receiving lane identifiers by reading electronic tags on canisters received from the drive-in banking stations, and wherein each of the canisters are associated with one of the drive-in banking stations, wherein each matching signal matches one of the plurality of teller transaction records to one of the drive-in banking stations; and storing records in a database wherein each of the records includes one of the plurality of teller transaction records and customer image data showing a customer associated with the transaction record proximate a time when the transaction record is made wherein the customer image data is received from the plurality of video signals each associated with the respective drive-in banking station.

2. The method of claim 1, wherein the step of receiving the plurality of video signals each associated with the respective drive-in banking station comprises receiving digital image data from a digital video camera.

3. The method of claim 1, wherein the step of receiving the plurality of video signals each associated with the respective drive-in banking station comprises receiving an analog video signal and converting the analog video signal into a digital representation.

4. The method of claim 1, wherein the step of receiving the plurality of teller transaction records comprises monitoring a connection between a teller station and a printer and detecting when the teller station has transmitted a transaction record to the printer.

5. The method of claim 4, wherein the step of receiving the plurality of teller transaction records further comprises monitoring a USB, parallel or serial connection between the teller station and the printer.

6. The method of claim 1, wherein the step of receiving the plurality of teller transaction records comprises monitoring a connection between a teller station and a bank server and detecting when the teller station has transmitted a transaction record to the bank server.

7. The method of claim 1, wherein the step of receiving the plurality of teller transaction records comprises monitoring a connection between a bank server and a teller station and detecting when the bank server has transmitted a transaction record to the teller server.

8. The method of claim 1, wherein the step of receiving matching signals comprises receiving teller identifiers and lane numbers through a keypad.

9. The method of claim 1, wherein the step of storing records in the database comprises storing the record in a computer hard drive.

10. The method of claim 9, wherein step of storing records in the database comprises storing the records in a relational database, wherein each record includes a field for the account number, the time and date, the amount, the transaction identifier and the teller identifier, and wherein the database is searchable based upon any one of these fields.

11. The method of claim 1, further comprising the step of receiving a plurality of video signals each associated with a respective teller station.

12. The method of claim 11, wherein the step of storing records in the database further comprises the step of storing an image of a teller received from the plurality of video signals each associated with the respective teller station.

13. A method of operating a database system especially suitable for saving image and transaction data obtained from a bank, the method comprising the steps of:

providing at least one teller station configured to receive transaction information from a teller and execute a banking transaction;

providing at least one transaction interface configured to monitor communications with the at least one teller station;

providing at least one customer station in a drive in-lane;

providing at least one video camera positioned to capture images of a customer at the at least one customer station in the drive-in lane;

providing an input operable to match transaction information with images of the customer at the station in the drive-in lane;

capturing an image of a customer at the at least one customer station in the drive-in lane through the at least one video camera;

capturing a transaction record through the at least one transaction interface;

receiving a signal from the input that matches the image of the customer at the at least one customer station in the drive-in lane with the transaction record; and receiving lane identifiers by reading electronic tags on canisters received from the at least one customer station, and wherein each of the canisters are associated with one of the at least one customer stations; and saving the transaction record and the image of the customer in a database.

14. The method of claim 13, wherein the step of providing at least one teller station comprises providing a computer and a printer.

15. The method of claim 13, wherein the step of providing at least one transaction interface comprises providing a hardware module that connects between a computer and a printer, wherein the hardware module is configured to monitor data sent from the computer to the printer to detect and capture data associated with a transaction record.

16. The method of claim 13, wherein the step of providing at least one transaction interface comprises providing a network device that monitors communications with the at least one teller station.

17. The method of claim 13, wherein the step of providing at least one customer station in the drive in-lane comprises providing a communication and conveyor system wherein the communication system permits the customer to communicate with a teller at the at least one teller station and the conveyor system permits the customer to transmit and receive a capsule with the teller.

18. The method of claim 13, wherein the step of providing at least one video camera comprises providing a digital video camera.

19. The method of claim 13, wherein the step of providing the input comprises providing a keypad for the teller to enter a teller identifier and a lane number.

20. The method of claim 13, wherein the step of capturing the image of the customer at the station in the drive-in lane comprises saving the image when the customer sends a capsule from the at least one customer station in the drive-in lane.

21. The method of claim 13, wherein the step of capturing the transaction record comprises detecting the transmission of a transaction record from a computer to a printer.

22. The method of claim 13, wherein the step of receiving the signal from the input comprises receiving a teller identification and a lane number associated with the at least one customer in the drive-in lane.

23. The method of claim 13, wherein the step of saving the transaction record and the image of the customer in a database comprises saving the transaction record and the image of the customer as a record so that the image can be retrieved based upon data in the transaction record.

* * * * *